United States Patent
Grimm et al.

(10) Patent No.: US 9,477,989 B2
(45) Date of Patent: Oct. 25, 2016

(54) METHOD AND APPARATUS OF DETERMINING RELATIVE DRIVING CHARACTERISTICS USING VEHICULAR PARTICIPATIVE SENSING SYSTEMS

(71) Applicant: GM GLOBAL TECHNOLOGY OPERATIONS LLC, Detroit, MI (US)

(72) Inventors: Donald K. Grimm, Utica, MI (US); Fan Bai, Ann Arbor, MI (US); Leonard C. Nieman, Warren, MI (US); Robert A. Hrabak, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/335,512

(22) Filed: Jul. 18, 2014

(65) Prior Publication Data
US 2016/0019651 A1    Jan. 21, 2016

(51) Int. Cl.
| G06F 19/00 | (2011.01) |
| G06Q 40/08 | (2012.01) |
| G06Q 50/00 | (2012.01) |
| G07C 5/00 | (2006.01) |
| H04L 29/08 | (2006.01) |
| H04W 4/04 | (2009.01) |

(52) U.S. Cl.
CPC .............. *G06Q 40/08* (2013.01); *G06Q 50/01* (2013.01); *G07C 5/008* (2013.01); *H04L 67/1095* (2013.01); *H04W 4/046* (2013.01)

(58) Field of Classification Search
CPC ...... G07C 5/08; G07C 5/0841; G07C 5/085; B60W 40/09
See application file for complete search history.

(56) References Cited

U.S. PATENT DOCUMENTS

| 8,682,572 | B2 | 3/2014 | Raz et al. |
| 9,141,112 | B1* | 9/2015 | Loo ................. G05D 1/0293 |
| 2007/0239322 | A1* | 10/2007 | McQuade ............. G07C 5/008 701/1 |
| 2010/0030582 | A1* | 2/2010 | Rippel ................. G06Q 40/08 705/4 |
| 2010/0160013 | A1* | 6/2010 | Sanders ............... G01S 5/0027 463/6 |
| 2010/0214089 | A1* | 8/2010 | Giuli ...................... H04L 67/38 340/459 |
| 2012/0239471 | A1* | 9/2012 | Grimm ............... G06Q 30/0251 705/14.5 |
| 2013/0006674 | A1* | 1/2013 | Bowne .............. G06Q 10/0639 705/4 |

(Continued)

FOREIGN PATENT DOCUMENTS

| EP | 1973078 A1 | 9/2008 |
| WO | 2013138798 A1 | 9/2013 |

OTHER PUBLICATIONS

Liimatainen, H. "Utilization of Fuel Consumption Data in an Ecodriving Incentive System for Heavy-Duty Vehicle Drivers" Intelligent Transportation Systems, IEEE Transactions, vol. 12, Issue 4, May 12, 2011, pp. 1087-1095.

(Continued)

*Primary Examiner* — Jonathan M Dager
(74) *Attorney, Agent, or Firm* — John A. Miller; Miller IP Group, PLC

(57) ABSTRACT

A system and method for sharing information from a vehicle for comparison to information from other vehicles. The system and method include collecting vehicle trace data and sharing the vehicle trace data using a communications network such that the vehicle trace data is compared and ranked relative to the vehicle trace data of other vehicles.

20 Claims, 3 Drawing Sheets

(56) References Cited

U.S. PATENT DOCUMENTS

| | | | |
|---|---|---|---|
| 2013/0073112 A1* | 3/2013 | Phelan et al. ................. 701/1 | |
| 2013/0090821 A1* | 4/2013 | Abboud ................. G07C 5/085 | 701/70 |
| 2013/0141249 A1* | 6/2013 | Pearlman ............... G09B 19/14 | 340/870.03 |
| 2013/0164715 A1* | 6/2013 | Hunt .................... G09B 19/167 | 434/65 |
| 2013/0166170 A1* | 6/2013 | Hunt .................... B60W 40/09 | 701/99 |
| 2013/0238432 A1* | 9/2013 | Bai .................. G06F 17/30867 | 705/14.52 |
| 2014/0180557 A1* | 6/2014 | Hunt ...................... B60T 8/172 | 701/99 |
| 2014/0199662 A1* | 7/2014 | Armitage et al. ............. 434/65 | |
| 2014/0282093 A1* | 9/2014 | Burke ................... H04W 4/022 | 715/753 |
| 2014/0309849 A1* | 10/2014 | Ricci ........................ B60Q 1/00 | 701/33.4 |
| 2015/0193885 A1* | 7/2015 | Akiva .................... G06Q 40/08 | 705/4 |
| 2015/0329120 A1* | 11/2015 | Fujisawa ................. G08G 1/20 | 701/123 |

OTHER PUBLICATIONS

Kargupta, Hillol et al. "MineFleet®: An Overview of a Widely Adopted Distributed Vehicle Performance Data Mining System", KDD '10, Jul. 25-28, 2010, Washington DC, USA, pp. 37-46.

* cited by examiner

METHOD AND APPARATUS OF DETERMINING RELATIVE DRIVING CHARACTERISTICS USING VEHICULAR PARTICIPATIVE SENSING SYSTEMS

BACKGROUND OF THE INVENTION

1. Field of the Invention

This invention relates generally to vehicular participative systems and, more particularly, vehicular participative systems that share vehicle/occupant information to allow for comparisons between vehicles and/or occupants of the vehicle.

2. Discussion of the Related Art

Telematics involve communication applications that send, receive, and store information via telecommunication devices between multiple remote entities using cloud computing. Cloud computing describes many computing concepts that involve a large number of computing devices connected through a communications network such as the Internet. Cloud computing enables a program or application to run on many connected computers at the same time. Information may be shared with other remote entities using cloud computing for a variety of reasons. For example, information may be shared to provide safety communications, emergency warnings, and vehicle tracking.

Vehicle data acquisition devices are used to collect vehicle information as well as operator attribute information from vehicle trace data of the vehicle as the vehicle is being operated. While this information is known to be used for emergency warnings and safety communications, there is a need in the art to enable vehicle operators to use the collected vehicle trace data in vehicle applications that allow for ranking of the performance of vehicle operators and/or to share the vehicle trace data in applications such as social networking applications. Such ranking information may be used by vehicle occupants as a form of information and/or entertainment (i.e., eco-driving or safe-driving score) or vehicle usage (i.e., time-of-day usage or travel routes) to determine insurance risk.

SUMMARY OF THE INVENTION

In accordance with the teachings of the present invention, a system and method for sharing information from a vehicle for comparison to information from other vehicles is disclosed. The system and method include collecting vehicle trace data and sharing the vehicle trace data using a communications network such that the vehicle trace data is compared and ranked relative to the vehicle trace data of other vehicles.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for collecting, processing, storing and sharing data, particularly vehicle and driver data, is merely exemplary in nature, and is in no way intended to limit the invention or its applications or uses.

Figure 1:
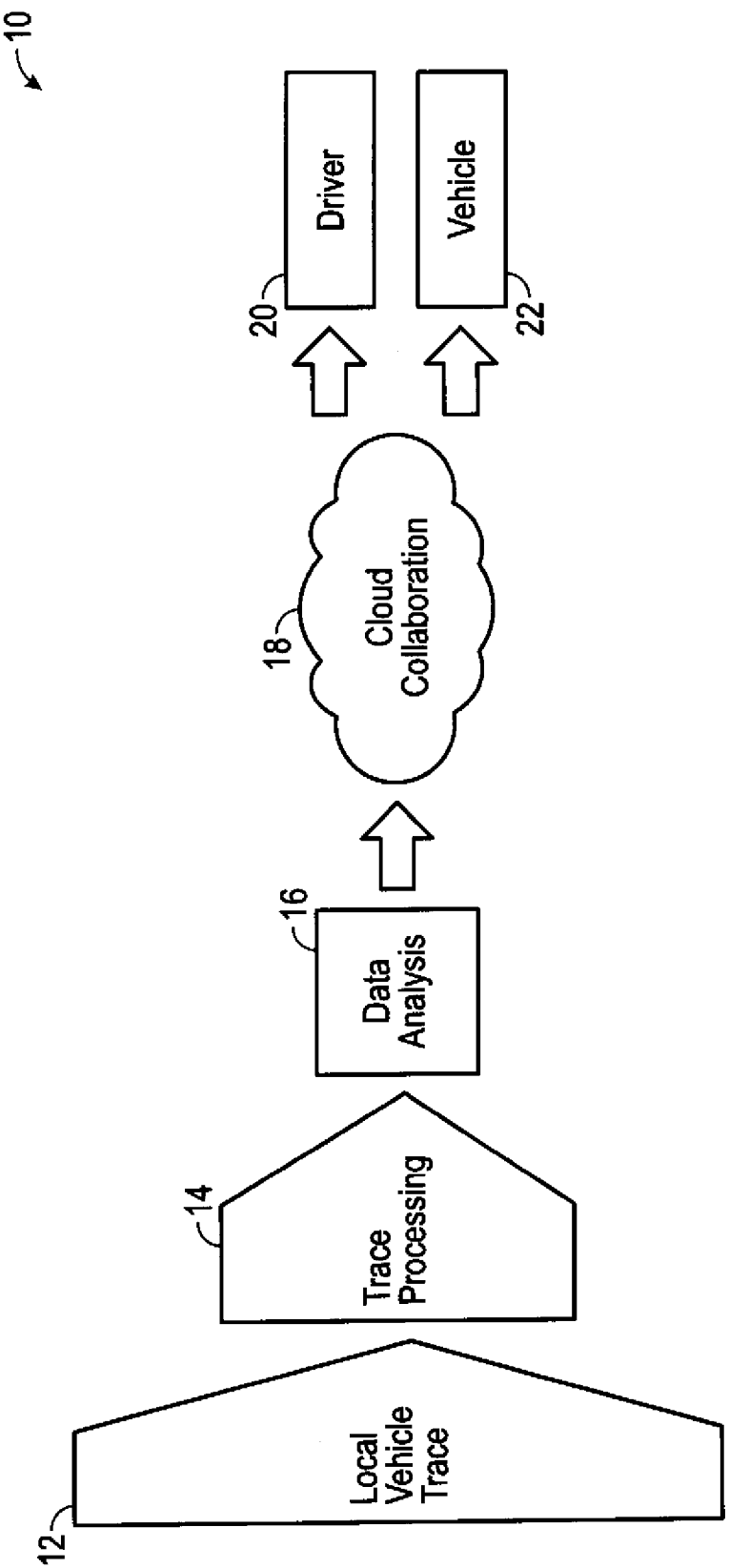
FIG. 1 is a flow diagram of an embodiment of a process for collecting, processing, storing and sharing data.

FIG. 1 is a flow diagram of a process 10 for collecting, processing, storing and sharing data. At box 12, local vehicle trace data is collected from a particular vehicle. Such vehicle trace data may be collected from vehicle sensors, vehicle mobility devices, etc. Examples of sensor data include vehicle speed, seatbelt use, etc. Examples of mobility data include micro-mobility data, e.g., driver style, and macro-mobility data, e.g., GPS, map location data. Additional data that may be collected may include content selections (AM/FM/XM settings) and paired device content (playlists, etc.). Essentially any information about the vehicle or its occupants that can be collected may be collected at the box 12.

Next, the data collected at the box 12 is processed at box 14. Processing includes filtering and compressing the data from the box 12 such that the data is filtered so that only desired data is compressed. The data selected in the filtering process will depend on the particular application being used. For example, fuel usage data will be selected for an application concerning fuel economy or accelerating and braking status information will be selected for an application concerning safe driving.

After the data has been processed at the box 14, the data is analyzed at box 16. Analysis of the data at the box 16 includes quantifying the data. The number of parameters included in the analysis as well as the weight of each parameter is predetermined according to the purpose of analyzing the data. For example, the data collected at the box 12 may be analyzed at the box 16 into an eco-score that is based on driving activity such that the driver is given a score based on the fuel efficiency of their driving habits. Scoring may be based on statistical categories that are ranked in an increasing or decreasing order using equations:

$$p_i = f(x_i^1, x_i^2, \ldots, x_i^n), \qquad (1)$$

$$cs_i = \Sigma_{j=1}^m a_j p_j^i, \qquad (2)$$

where $cs_i$ is the credit score of the $i^{th}$ vehicle, $p_j^i$ is a desired property, e.g., average miles per gallon (mpg), standard deviation mpg, etc., $x_i$ are the vehicle parameters of interest, i.e., raw serial data, and $a_j$ is a weighing value of the specific property of interest.

Raw vehicle parameters $x_i^j$ is not shown to protect customer data, only the processed $cs_i$ is shown. Furthermore, local data is not shared to the cloud, discussed below. Instead, the vehicle creates an anonymous identifier between the vehicle and the cloud to preserve customer anonymity.

To analyze the collected vehicle trace data at the box 16, a controller of the vehicle records a time series for parameters of interest, e.g. mpg, at the box 12, and applies the following weighting factors to each at the box 16:

$$\bar{x}_t = \sum_{t=1}^T \frac{xi(t)}{T}, \qquad (3)$$

which represents an average ($p_1^i$), and:

$$\tilde{x}_t = \sqrt{\sum_{t=1}^{T} \frac{(xi(t) - \bar{x})}{T - 1}}, \quad (4)$$

which represents a standard deviation ($p_2^i$), and:

$$ci = \max(xt \ldots xt+T<\text{threshold}) \forall t, \quad (5)$$

which represents consistency ($p_3^i$), and:

$$\hat{\beta}t = \frac{\sum_{i=0}^{n}(xi - \bar{x})(yi - \bar{y})}{\sum_{i=0}^{n}(xi - \bar{x})2} > 0, \quad (6)$$

which represents trend ($p_4^i$).

Once the data has been analyzed as discussed above at the box 16, the analyzed data and resulting score is transmitted to the computing cloud at cloud 18 where a comparison of the scores of multiple vehicle occupants/vehicles is available such that drivers can see where they score relative to others. The analyzed data and the calculated score is ranked in the cloud 18, and is shared with select vehicle occupants and vehicles at boxes 20 and 22, respectively. Although not shown, the ranking information from the cloud 18 may also be shared with others, such as insurance companies and/or fleet managers. Additionally, although not shown for the sake of clarity, instead of, or in addition to, using the cloud 18 the analyzed data may be shared using vehicle-to-vehicle (V2V) communication systems and/or cellular/infrastructure/pedestrian communications. In V2V systems data may be collected over time for a volume of comparison data to be used for the desired ranking. Using the cloud 18 or V2V systems, for repeat encounters of the same vehicle the data previously collected will be updated so that the rankings are based on the most recent data available.

Figure 2:
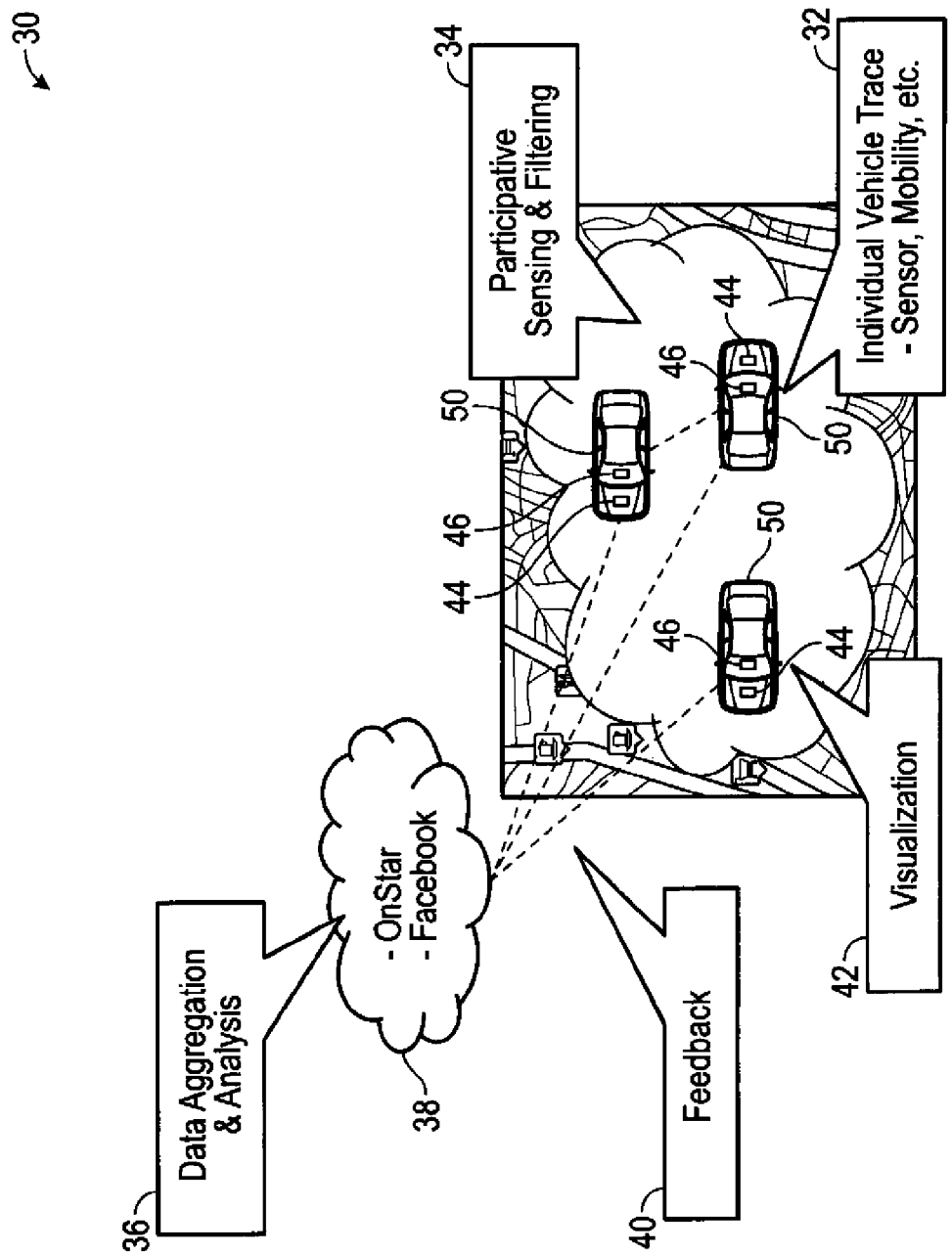
FIG. 2 is a schematic diagram of an embodiment of the process for collecting, processing, storing and sharing data.

FIG. 2 is a schematic diagram of a process 30 employed by vehicle control systems 44 for collecting, processing, storing, and sharing vehicle/vehicle occupant data. At box 32 vehicle trace data, such as sensor trace data and/or mobility trace data, discussed above, is collected from a vehicle 50. An example of collecting vehicle trace data can be found in U.S. Patent Application Publication No. 2012/0239471 entitled, "Learning Driver Demographics From Vehicle Trace Data", filed Mar. 14, 2011, assigned to the assignee of the present application and incorporated herein by reference. The vehicle trace data from the box 32 is filtered and compressed in a predetermined manner at box 34 such that only the desired data is analyzed at box 36. For example, the data filtered and compressed at the box 34 may be limited to information that the occupant of the vehicle 50 has authorized to share, as described in more detail below.

The data collected from the vehicle 50 at the box 34 may be combined with other information such as information from one or more social networking websites. Analysis of the filtered and compressed data at the box 36 typically includes assigning a score to the data as described above. The analyzed data from the box 36 is shared via a computing cloud at cloud 38. The sharing operation could be triggered based on achieving a milestone. The cloud 38 enables the aggregated and analyzed data from the box 36 to be combined with information from, for example, social networking sites and also allows the data from the box 36 to be shared with other drivers/vehicles. For example, at box 40 the information from the could 38 is provided as feedback to the vehicles 50 that have participated in the ranking by providing the information to one or more of the driver's social networking profiles or to the driver's smartphone or similar device. At box 42 the comparison information, i.e., rankings, from the cloud 38 may be provided to the vehicle 50 as visual data by using a vehicle's display device 46. Statistical categories that are ranked in an increasing or decreasing order and the resulting data may be presented to the user as a visual display that indicates their "social status".

The ranking may be monitored by occupants of the vehicle 50 as a form of information and/or entertainment, and the relative performance metrics, i.e., ranking, may, by way of example, encourage energy efficient or safe driving practices. The ranking also introduces a social networking aspect to driving activity. Additionally, the results may be used by insurance companies to set insurance rates or by fleet managers for awards and incentives.

The vehicle control systems 44 may also use vehicle trace encounters to initiate competitive matches. These matches could consist of competitions between vehicle data (e.g., eco-driving information), or between user content that is accessed via the cloud 38 or synchronized with a local device such as a vehicle occupant's smartphone. In the latter case, the user content consists of data that can be compared according to a set of rules and may result in a win, loss, or collection of points (e.g., a matchup between fantasy sports teams in which a set of categories is ranked to define a point total). Alternatively, a matchup may be based on data that is available on a user's social networking account. During vehicle encounters, a match may be created among two or more parties and the competition results could be stored for access by the driver either on demand or as part of an infotainment human machine interface (HMI). An example of scoring would be to identify data columns that represent the statistical categories of the game, rank the columns from 1 . . . n, and sum the rank values across a row for each competitor. Thus, the vehicle control systems 44 may bring gaming to the peer-to-peer level, where the vehicles 50 that encounter each other on the roadway can compare various statistics that can be ranked and scored. This brings "global" competition down to a local level, which may increase customer interest. However, the vehicles 50 need not be in the same location to compete, as this is merely one example of how the process 30 may be used.

Figure 3:
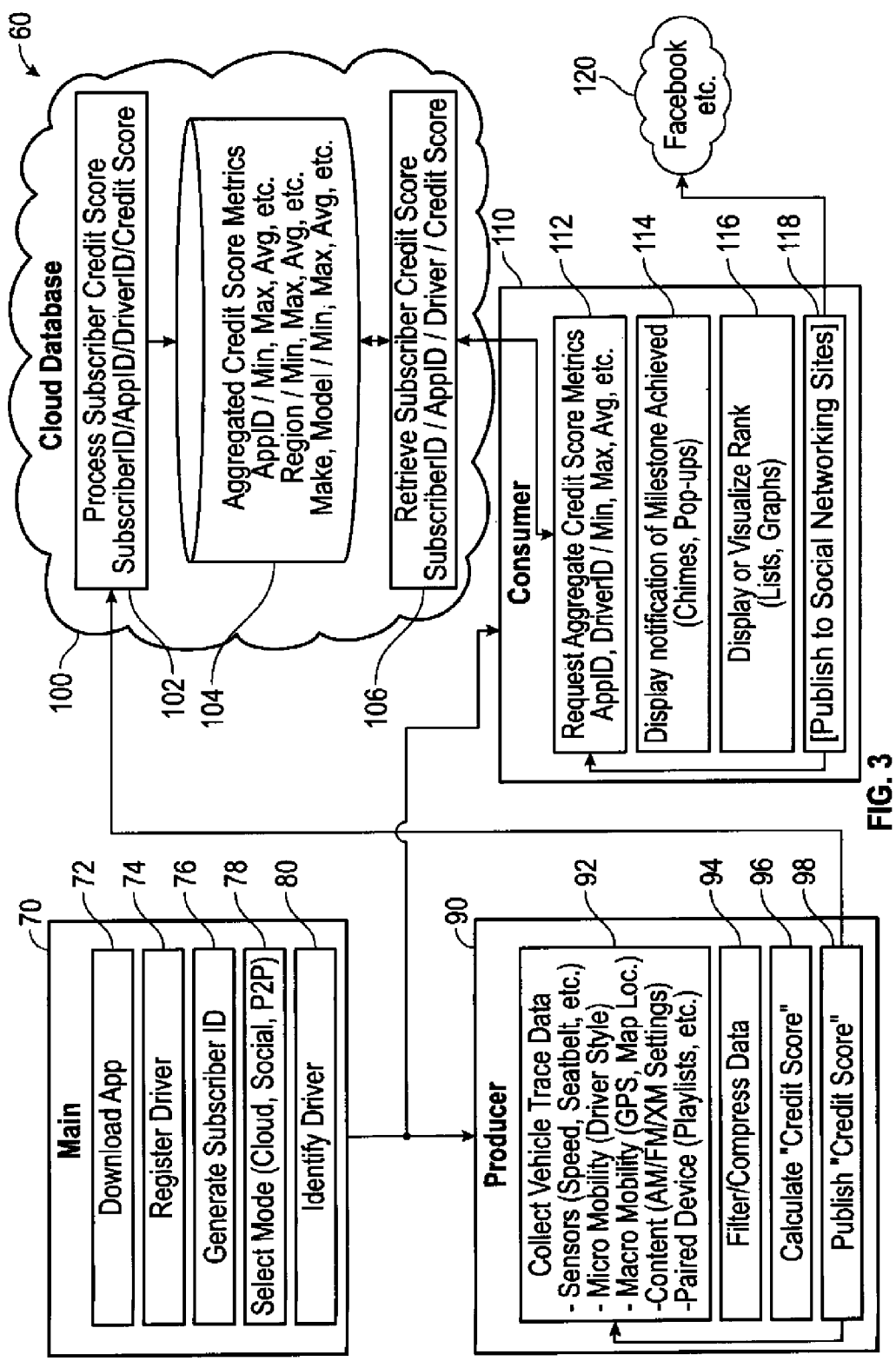
FIG. 3 is a flow diagram of another embodiment of a process for collecting, processing, storing and sharing data.

FIG. 3 is a flow diagram of a process 60 for collecting, processing, storing and sharing data. At a main box 70, authorization to participate in the process 60 occurs. In particular, a driver or user chooses to download a particular application associated with the process 60 at box 72. For example, a driver may choose to download the eco score application discussed above. Once the chosen application is downloaded at the box 72 the driver is registered with the application at box 74 and a subscriber ID is generated at box 76. Next, the driver selects the mode of operation of the application at box 78 to determine how the information gathered by the application is used. For example, the user may choose to share the data via computing cloud, social networking sites, or P2P sharing. Once the driver selects the mode of information sharing at the box 78 the identity of the driver/user is created at box 80 that identifies the driver/user when sharing information. At a later vehicle start, the identity of the driver may be entered before the application begins or the driver identity may be determined based on vehicle sensor data such as seat position or based on the identity of the paired device, etc.

Once the desired participation is determined, the information is collected, filtered, stored and shared at box 90. Specifically, vehicle trace data is collected at box 92. As stated above, the vehicle trace data that is collected may include sensor data, micro mobility and macro mobility data, content and/or paired device data. Next, the vehicle trace data is filtered and compressed at box 94 and the data is calculated into some form of quantified data, such as a score as described in detail above at box 96. The quantified data from the box 96 is then published at box 98 as determined by the driver/user at the box 78. For example, the quantified data may be published to cloud 100 in a manner understood by those skilled in the art.

Once the score from the box 98 is published to the cloud 100, the score and the associated subscriber ID, application ID and driver ID are processed at box 102. Scores from participants of the application are aggregated at box 104. The score metrics may be aggregated in a variety of ways, such as by application ID, region, make/model of vehicle, virtual group, etc. For the eco score example, the minimum, maximum and average fuel economy of a particular vehicle may be aggregated with application ID, region, and the make and model of the vehicle. The type of information that is aggregated may vary according to the application being used, and may vary according to driver/user selection. At box 106 a database selection operation occurs that retrieves the determined score based on the selected query. For example, the database operation at the box 106 may generate a performance ranking of average speed for a driver of the vehicle versus all Corvette vehicles in Michigan, or may generate a performance ranking of Facebook "likes" for the driver versus any vehicle within a 5 km radius of me). A mechanism for automatically presenting various types of common rankings may be available via the HMI for database selection. For example, a rotating list of ranks by geographic region, vehicle make, etc. may be available for selection via the HMI.

The subscriber's credit score from the box 106 is shared with the driver in various ways at box 110. For example, upon request at box 112, the driver may receive aggregate score metrics that include application ID, driver ID, and for the eco score application example, minimum, maximum and average fuel economy. A display notification such as a chime or pop-ups that indicate milestones achieved may be provided at box 114 and/or a display of visual rank such as a list or graph may be provided at box 116. For example, the score of each vehicle/user may be mapped on a graph that is displayed and the score of the vehicle/user as a rank in percentile may be reported. Additionally, the aggregate score metrics in any format desired may be published at box 118 to social networking cites at box 120, such as Facebook, Twitter, etc.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for sharing information from a vehicle for comparison to information from other vehicles, said method comprising:
    collecting vehicle trace data wherein the vehicle trace data includes information collected from the vehicle, a device of an occupant of the vehicle, or a combination thereof;
    filtering and compressing the collected vehicle trace data such that predetermined parameters are analyzed and weighted in a predetermined manner;
    creating a score from the data that has been filtered, compressed and analyzed, where creating a score includes storing time-series data for each of one or more parameters, calculating an average, a standard deviation, a consistency metric and a trend metric from the time-series data, and determining the score as a weighted summation of the average, the standard deviation, the consistency metric and the trend metric, where weight factors for the summation are predetermined separately for the average, the standard deviation, the consistency metric and the trend metric for each of the one or more parameters;
    creating an anonymous identifier to preserve the anonymity of vehicle information and a vehicle occupant; and
    sharing the score using a communications network such that the vehicle occupant and the vehicle information is compared and ranked relative to the vehicle trace data of the other vehicles.

2. The method according to claim 1 wherein sharing the score using a communications network includes using cloud computing and cellular communications.

3. The method according to claim 1 wherein sharing the score using a communications network includes using vehicle-to-vehicle communications.

4. The method according to claim 1 further comprising displaying the score and rank in percentile to occupants of the vehicle using a visual display device.

5. The method according to claim 1 further comprising publishing the score, rank, or a combination thereof on one or more social networking websites.

6. The method according to claim 1 further comprising downloading an application to the vehicle and registering a driver for the application to allow data to be collected, filtered, compressed, analyzed and shared for the application.

7. The method according to claim 1 wherein the data collected is used to calculate an eco-driving score.

8. The method according to claim 1 wherein the data collected is used to calculate a safe-driving score based on driving style.

9. The method according to claim 1 wherein the data collected is used to calculate a safe-usage score based on vehicle usage times and travel locations.

10. A method for sharing information from a vehicle for comparison to information from other vehicles, said method comprising:
    collecting vehicle trace data, wherein the vehicle trace data includes information collected from the vehicle, a device of an occupant of the vehicle, or a combination thereof, said collected vehicle trace data being data that an occupant of the vehicle has authorized to share;

creating a score from the vehicle trace data, where creating a score includes storing time-series data for each of one or more parameters, calculating an average, a standard deviation, a consistency metric and a trend metric from the time-series data, and determining the score as a weighted summation of the average, the standard deviation, the consistency metric and the trend metric, where weight factors for the summation are predetermined separately for the average, the standard deviation, the consistency metric and the trend metric for each of the one or more parameters; and sharing the vehicle trace data and the score using a communications network such that the vehicle trace data and the score are compared and ranked relative to the vehicle trace data and score of other vehicles.

11. The method according to claim 10 wherein sharing the vehicle trace data and the score using a communications network includes using cloud computing, cellular communications, vehicle-to-vehicle/infrastructure/pedestrian communications or a combination thereof.

12. The method according to claim 10 further comprising displaying the vehicle trace data and rank in percentile to occupants of the vehicle using a visual display device.

13. The method according to claim 10 further comprising publishing the vehicle trace data, rank, or a combination thereof on one or more social networking websites.

14. The method according to claim 10 further comprising downloading an application to the vehicle and registering a driver for the application to allow the data to be collected and shared by the application.

15. A vehicle participative system for sharing information from a vehicle for comparison to information from other vehicles, said system comprising:

a vehicle information collection and processing system that includes:

means for collecting vehicle trace data, wherein the vehicle trace data includes information collected from the vehicle, a device of an occupant of the vehicle, or a combination thereof, said collected vehicle trace data being data that an occupant of the vehicle has authorized to share;

means for creating a score from the vehicle trace data, where creating a score includes storing time-series data for each of one or more parameters, calculating an average, a standard deviation, a consistency metric and a trend metric from the time-series data, and determining the score as a weighted summation of the average, the standard deviation, the consistency metric and the trend metric, where weight factors for, the summation are predetermined separately for the average, the standard deviation, the consistency metric and the trend metric for each of the one or more parameters;

means for sharing the vehicle trace data and the score using a communications network such that the vehicle trace data is compared and ranked relative to the vehicle trace data and score of other vehicles; and means for creating a matchup based on the vehicle trace data of at least two vehicles during a vehicle encounter on a roadway and providing competition results based on the matchup.

16. The vehicle participative system according to claim 15 wherein the means for sharing the vehicle trace data and the score using a communications network uses cloud computing, cellular communications, vehicle-to-vehicle/infrastructure/pedestrian communications or a combination thereof.

17. The vehicle participative system according to claim 15 further comprising means for displaying the vehicle trace data and rank in percentile to occupants of the vehicle using a visual display device.

18. The vehicle participative system according to claim 15 further comprising means for publishing the vehicle trace data, rank, or a combination thereof on one or more social networking websites.

19. The vehicle participative system according to claim 15 further comprising means for downloading an application to the vehicle and registering a driver for the application to allow the vehicle trace data to be collected and shared.

20. The method according to claim 1 wherein sharing the score using a communications network does not include showing raw vehicle parameters to protect customer data.

* * * * *